United States Patent Office 3,503,919
Patented Mar. 31, 1970

3,503,919
MOLDING MATERIALS FOR THE PRODUCTION OF PLASTIC ARTICLES
Anton Cadus, Ludwigshafen (Rhine), Germany, assignor to Badische Anilin- & Soda-Fabrik Aktiengesellschaft, Ludwigshafen (Rhine), Germany
No Drawing. Filed Oct. 24, 1966, Ser. No. 588,723
Claims priority, application Germany, Oct. 28, 1965, 1,544,661
Int. Cl. C08f *45/10;* C08g *51/10*
U.S. Cl. 260—37　　　　　　　　　　　　　　5 Claims

ABSTRACT OF THE DISCLOSURE

A molding composition for the production of plastic articles having a smooth surface resembling metal comprising a synthetic plastics material, a lamelliform pigment, and a fibrous material having a length of 2–2000 microns.

---

The present invention relates to pigment- and fiber-containing molding materials for the production of plastic articles having a smooth surface resembling metal.

It is known that pigmented organic molding materials can be used for the production of plastic articles and that inter alia acicular or lamelliform metal particles may serve as pigments. Plastic articles made from these pigmented molding materials do not however have a surface exhibiting a metallic appearance so that they must be subsequently treated in order to produce for example the so-called hammered effect of a metallic surface. Both this method and the production and treatment of articles which are not smooth have various disadvantages. For example, articles which are not smooth, not to mention the increased cost of preparing the mold, cannot in all case be removed easily from the mold, and subsequent treatment involves additional steps which substantially increase the cost of manufacture. Moreover, articles which do not have smooth surface are difficult to clean.

It is also well known that plastic articles can be prepared from organic compositions which contain short fibers of inorganic material, for example glass fibers or asbestos fibers having a length of a few millimeters, solely to increase the strength of the manufactured articles.

It is an object of this invention to improve the conventional organic molding compositions based on moldable organic synthetic plastics materials and acicular or lamelliform pigments so that plastic articles can be produced which have a metallic appearance without there being any need for aftertreatment. It is another object of the invention to improve said conventional organic molding compositions so that articles made therefrom exhibit a very smooth surface and the desired hammered effect. A further object of the invention is to provide plastic articles having a metallic appearance which can be easily and economically produced and which avoid the disadvantages associated with the production and use of such articles in the prior art.

We have found, in accordance with the invention, that these and other objects can be achieved with a conventional moldable synthetic organic plastics material, if said material contains (a) 0.01 to 5%, particularly 1 to 5%, by weight of an inorganic acicular or lamelliform pigment having a glossy surface and (b) 5 to 60%, in particular 5 to 30%, by weight of fibers having an average length of 2 to 2000 microns which are not soluble in the palstics material and which remain solid, i.e. do not melt under the conditions of processing, the percentages being with reference to the total weight of the molding composition.

We have also found that the best results are achieved with conventional thermoplastic injection molding or extrusion molding materials.

Suitable inorganic pigments (a) are generally those whose size in one or two dimensions is at least twenty times and preferably 20 to 2000 times the other dimension or dimensions. Very suitable pigments include metal leaflets of aluminum, bronze, silver or gold, or for example leaflets of mica. Suitable metal leaflets having a size in the largest dimension of 30 to 200 microns are preferred.

Suitable fibrous materials (b) are preferably glass fibers or asbestos fibers of the stated length and preferably of a diameter of about 1 to 100 microns. However, it is also possible to use synthetic organic fibers of fiber-forming macromolecular organic compounds, such as cellulose acetate, linear polyesters, such as polyethylene terephthalate, or linear synthetic polyamides, such as polycaprolactam, polylaurolactam, or polyhexamethylene adipamide, provided that these organic fibers do not dissolve in the plastics base material or melt under the conditions of processing. In other words, such organic fibers must have a higher softening point than the plastics base material so as to remain solid at normal extrusion or molding temperatures.

The plastics base material is particularly one of the thermoplastic synthetic organic plastics having a molecular weight of at least 3000, for example styrene polymers containing at least 50% by weight of polymerized styrene units, such as polystyrene, copolymers of styrene and acrylonitrile, polymers of styrene, acrylonitrile and polybutadiene, as well as other thermoplastics such as polyvinyl chloride, polyethylene, polypropylene and linear synthetic polyamides having recurring amido groups as an integral part of the linear polymer chain whose shaping is preferably carried out by injection molding or extrusion. Conventional thermosetting molding materials based on ureaformaldehyde resins, phenolformaldehyde resins, unsaturated polyester styrene resins and epoxy resins which can be further processed for example by molding or casting methods, are also suitable. Suitable resins are generally known.

Although it is of minor importance for the process how the fibers (b) are worked into the molding materials, it is advisable for technical reasons in the case of glass fibers to do this by the method of U.S. patent application No. 480,099, filed on Aug. 16, 1965 by Anton Cadus now U.S. Patent 3,304,282. This method consists substantially in introducing a bundle of glass filaments into the melt of the thermoplastic and comminuting the filaments to the desired length in the melt. This method, which can be used with equal success for the molding materials of thermosetting plastics which have not yet been cured, does not have the disadvantage that preformed short glass fibers destroy the mixing apparatus or the molds of injection molding machines by abrasion within a short time during mixing with the plastic composition.

Molding compositions according to the invention, which are independent as regards the plastics or resinous material used, may contain in usual amounts, in general in amounts of 0.1 to 30% by weight of the composition, any desired additives, such as dyes, conventional pigments, antistatics, fillers or lubricants, to achieve special effects.

The articles obtained from these compositions by molding have a smooth surface whose appearance, for example when using aluminum bronze, is almost exactly like that of hammered metal. It is therefore possible for the first time in practice to prepare plastic articles having a metallic appearance and in particular having the desired hammered effect in a simple and direct manner.

The invention is illustrated by but not limited to the following examples.

EXAMPLE 1

100 kg. of granular polycaprolactam is mixed in a high speed mixer with 2 kg. of an aluminum bronze (approximate average dimensions of the leaflets 1 x 20 x 60 microns) and 0.5 kg. of calcium stearate as lubricant. The mixture is melted and 20 kg. of glass filaments is added. The filaments with a mean diameter of 20 microns are reduced in an extruder to a length of 20 to 2000 microns and then the mixture of plastic and glass fibers is extruded in strand form. The plastic strands are granulated and dried.

Injection moldings are prepared with this molding material using conventional equipment. Their surface is smooth and resembles hammered metal.

EXAMPLE 2

An injection molding having a smooth surface but with a metallic appearance is prepared from 50 kg. of ground polystyrene, 1 kg. of coarse gold bronze (dimensions 1.5 x 30 x 70 microns) and 15 kg. of glass filaments having a mean diameter of 25 microns and a length of 300 microns in the manner described in Example 1.

EXAMPLE 3

20 kg. of a thermosetting casting resin which is ready for use, 0.45 kg. of a gold bronze (dimensions 1.5 x 30 x 50 microns) and 5 kg. of short glass fibers having an average length of 20 to 2000 microns and an average diameter of 20 microns at the beginning of the polycondensation of the casting resin are mixed together by stirring until sedimentation of the pigment and glass fibers can no longer take place owing to the increasing viscosity. Molding of the casting resin is carried out immediately thereafter. An article having a smooth surface with a metallic appearance is obtained.

I claim:

1. An improved molding composition for the production of a plastic article having a smooth surface with a metallic hammered appearance comprising a moldable organic synthetic plastics material, a pigment and a fibrous material, said composition containing as a pigment
   (a) 0.01 to 5% by weight, with reference to the composition, of lamelliform metal particles having a particle size in the largest dimension of 30 to 200 microns, and as a fibrous material
   (b) 5 to 60% by weight, with reference to the composition, of glass or asbestos fibers of a diameter of about 1 to 100 microns and having a length of 2 to 2000 microns.

2. An improved molding composition as claimed in claim 1, wherein the particles (a) consist essentially of leaflets of aluminum or bronze.

3. An improved molding composition as claimed in claim 1, wherein the organic synthetic plastics material is a thermoplastic styrene polymer.

4. An improved molding composition as claimed in claim 1, wherein the organic synthetic plastics material is a synthetic thermoplastic linear polyamide having recurring amido groups as an integral part of the linear polymer chain.

5. Molded plastic articles when prepared from a molding material as claimed in claim 1.

References Cited

UNITED STATES PATENTS

| | | |
|---|---|---|
| 2,598,854 | 6/1952 | Stolz et al. |
| 2,936,487 | 5/1960 | Paz. |
| 3,041,303 | 6/1962 | Nelson. |
| 3,238,601 | 3/1966 | White _____ 161—158 |
| 3,304,282 | 2/1967 | Cadus _____ 260—41 |

OTHER REFERENCES

Delmonte, J., Metal-Filled Plastics, Reinhold Pub. Corp., 1961, New York, pp. 108 and 119.

Edwards, Junius David, Aluminum Paint and Powder, Reinhold Pub. Corp., 1955, New York, pp. 195 and 196.

ALLAN LIEBERMAN, Primary Examiner

J. H. DERRINGTON, Assistant Examiner

U.S. Cl. X.R.

260—38, 39, 40, 41, 41.5